United States Patent [19]
Bauer et al.

[11] Patent Number: 5,927,821
[45] Date of Patent: Jul. 27, 1999

[54] HYDRAULIC AUTOMOTIVE VEHICLE BRAKE SYSTEM

[75] Inventors: Jurgen Bauer, Weisbaden; Heinz Zingel, Bad Camberg; Peter Bohm, Friedrichsdorf; Peter Drott, Frankfurt am Main; Ulrich Knothe, Braunschweig; Bastian Witte, Bielefeld; Ruprecht Sinnhuber, Gifhorn, all of Germany

[73] Assignee: ITT Automotive Europe GmbH, Germany

[21] Appl. No.: 08/704,646

[22] PCT Filed: Mar. 14, 1994

[86] PCT No.: PCT/EP94/00791

§ 371 Date: Mar. 10, 1997

§ 102(e) Date: Mar. 10, 1997

[87] PCT Pub. No.: WO95/25027

PCT Pub. Date: Sep. 21, 1995

[51] Int. Cl.$^6$ ............................ B60T 7/06; B60T 8/88; B60R 21/00
[52] U.S. Cl. ............................ 303/1; 180/271; 60/554; 280/735; 303/122; 303/114.1
[58] Field of Search ............................ 303/114.1, 114.3, 303/1, 119.1, 87, 113.1, 2, 116.1, 24.1, 122, 19; 701/45, 48, 46; 188/151 A, 371, 356, 357, 358, 359; 180/271, 282, 274, 276; 280/734, 735; 293/5; 307/10.1; 91/1, 376 R; 60/533, 554, 594, 403, 413, 591, 582; 92/129

[56] References Cited

U.S. PATENT DOCUMENTS 5,066,076  11/1991  Tröster ................................. 303/113.1
5,634,337  6/1997   Gautier et al. ....................... 180/271
5,737,919  4/1998   Gautier et al. ....................... 60/403

FOREIGN PATENT DOCUMENTS 4107934  10/1992  Germany.
4304565  8/1994   Germany.

OTHER PUBLICATIONS

Search Report of the German Patent Office.

*Primary Examiner*—Douglas C. Butler
*Attorney, Agent, or Firm*—Rader, Fishman & Grauer PLLC

[57] ABSTRACT

A hydraulic automotive vehicle brake system with an actuating assembly that is attached to the splashboard of the automotive vehicle and is operable by the vehicle brake pedal. In order to reduce the possibility of risk to the driver during a collision (especially a rear end collision), the present invention provides a system which simulates an increase volume requirement of the brake system, thus permitting increased actuating travel of the actuating assembly.

15 Claims, 4 Drawing Sheets

HYDRAULIC AUTOMOTIVE VEHICLE BRAKE SYSTEM

TECHNICAL FIELD

The present invention relates to a hydraulic automotive vehicle brake systems.

BACKGROUND OF THE INVENTION

In particular in accidents where deformations of the front part of the automotive vehicle are caused, it is known that there is the risk that components positioned in this area (especially the actuating assembly of the hydraulic brake system fitted to the splashboard) will reduce the space directly ahead of the driver so that injuries are imminent. Therefore, German patent application No. 37 41 881, for example, discloses an arrangement which prevents tilting movements of actuating pedals arranged on a pedal carrier member which occur in a collision and, in addition, ensures increased leg room. To this end, all mounting supports of the pedal carrier member at the splashboard will automatically detach during a collision, and the pedal carrier member covers an opening in the splashboard, which extends beyond the projection of the pedals, so that it is allowed to freely escape into the engine compartment when acted upon by inertia forces.

A disadvantage of this known assembly is that free space must be provided in the front part or the engine compartment of the automotive vehicle which space, from a present point of view, will become limited in the future. Further, the prior art assembly has a relatively sophisticated construction of much weight which must prevent inadvertent detachment of the pedal assembly.

Therefore, an object of the present invention is to make provisions in a hydraulic automotive vehicle brake system of the previously mentioned type permitting, in a space-saving manner, a flexible arrangement of the individual components in the automotive vehicle which can be achieved by minimum effort and weight.

According to the present invention, this object is achieved by means which simulate an increased volume requirement of the brake system in an accident causing deformations of the front part of the automotive vehicle and, thus, permit an increased actuating travel of the actuating assembly. Thus, the present invention provides a controlled termination of the force applied to the brake pedal by the foot of a driver in a frontal crash, thereby reducing the force impulse that is due to the impact and largely eliminating the risk of foot or knee injuries.

SUMMARY OF THE INVENTION

To specify the concept underlying the present invention, it is suggested that a pressure fluid receiver is connected to at least one of the pressure chambers of the master brake cylinder, and the connection between the pressure fluid receiver and the pressure chamber is opened by a hydraulic valve in the case of an accident.

In a preferred aspect of the present invention, a restrictor is inserted into the connection. It is achieved by this provision that an abrupt discontinuance of the pedal force is reliably prevented, or rather a shock absorber effect is provided.

In a preferred aspect of the present invention which has a particularly compact-size construction and is simple to manufacture, the hydraulic valve is a three-way/two-position directional control valve permitting a permanent connection between the pressure chamber and the wheel brakes. The valve is preferably operable electromagnetically, and the electromagnetic actuation is adapted to be triggered by output signals of a crash sensor.

In an embodiment of the present invention which permits low-cost manufacture, the valve takes the form of a slide valve. It is especially appropriate that the pressure fluid receiver and the hydraulic valve form a construction unit. In particular, this measure serves enhancing the operational reliability of the automotive vehicle brake system of the present invention.

In another favorable embodiment of the present invention, the manufacturing and assembling costs of the automotive vehicle brake system of the present invention are reduced further because the valve is operable by inertia forces caused in an accident. This measure permits exactly determining the trigger threshold of the arrangement of the present invention by simply balancing the movable masses.

In a preferred aspect of the present invention which is favorable to realize in terms of manufacturing technology, the construction unit is designed integrally with the master brake cylinder.

Another embodiment is particularly suitable for use in automotive vehicles equipped with an ABS system, wherein an ABS pressure modulator is interposed between the master brake cylinder and the connected wheel brakes. The ABS pressure modulator includes a motor-and-pump assembly, to the pressure side of which the pressure chambers of the master brake cylinder, on the one hand, and, on the other hand, the wheel brakes are connected by way of electromagnetically operable inlet valves. The wheel brakes are connectable to low-pressure accumulators by way of electromagnetically operable outlet valves. The low-pressure accumulators are connected to the suction side of the motor-and-pump assembly, and an electronic control unit is provided to generate actuating or change-over signals for the inlet and outlet valves. It is particularly appropriate in such brake systems that the pressure fluid receivers are provided by the low-pressure accumulators and the hydraulic valves are provided by the outlet valves, and the electronic control unit for generating the change-over signals for the outlet valves is triggered by the output signal of an acceleration sensor adapted to be activated in an accident. The mentioned acceleration sensor may take the form of an acceleration-responsive, electromechanic switch or an airbag sensor, for example.

In order to move the brake pedal in the event of a crash to a zone which is uncritical with respect to leg injuries, in another feature of the present invention, the brake power booster is a vacuum brake power booster, the control valve of which is operable by a valve piston operatively connected to the brake pedal, on the one hand, and by an electromagnet that is displaceable jointly with the valve piston, on the other hand, irrespective of the pedal force acting on the brake pedal, wherein the electromagnet in an accident is operable by way of a control signal which is generated by the electronic control unit simultaneously with the change-over signals for the outlet valves.

Finally, in order to ensure a residual braking effect in the event of a crash, the pressure fluid receivers have a smaller size in terms of volume than the pressure chambers of the master brake cylinder.

DETAILED DESCRIPTION OF THE PREFERRED EMBODIMENTS

Figure 1:
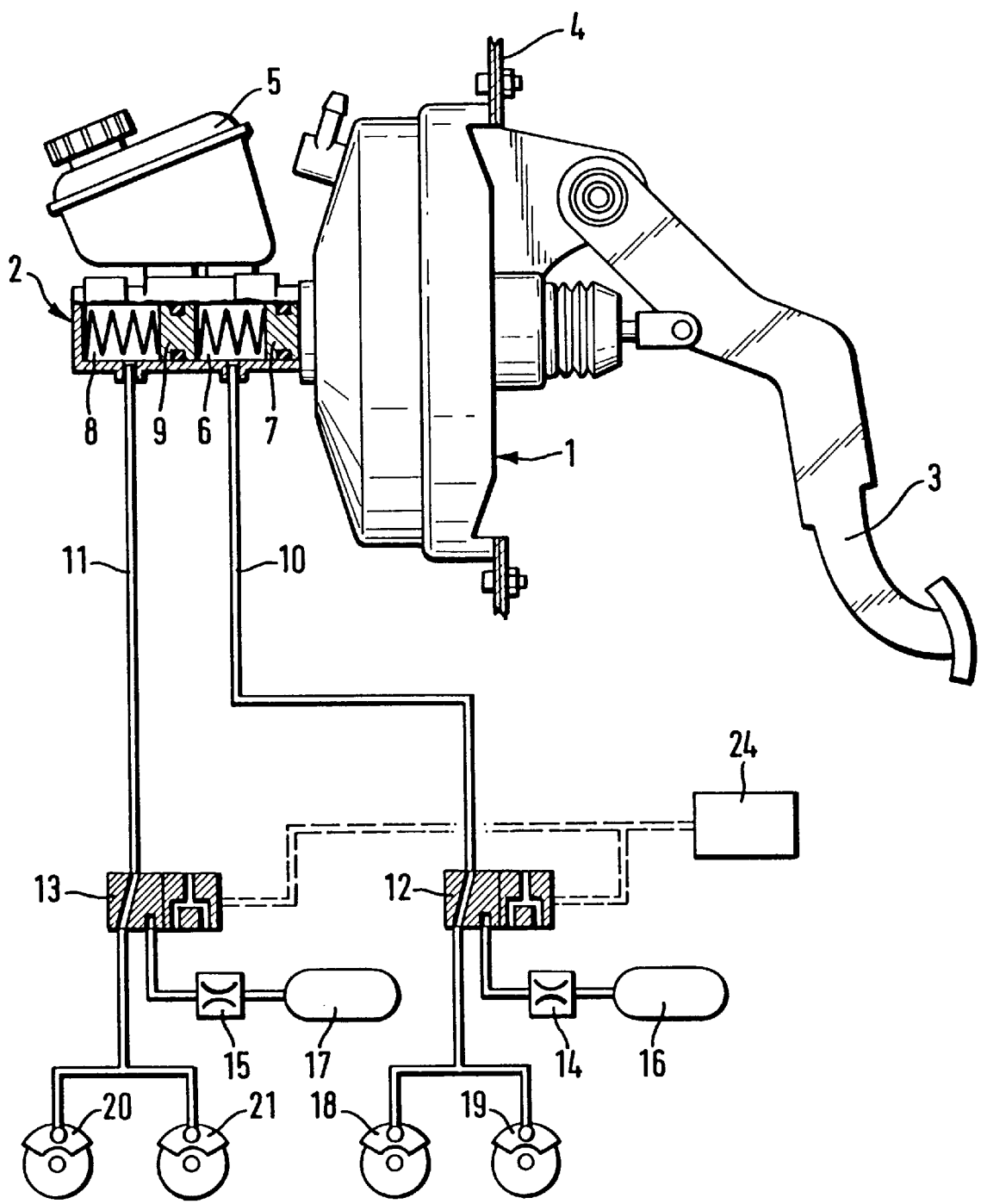
FIG. 1 is a first embodiment of the hydraulic automotive vehicle brake system of the present invention.

The hydraulic automotive vehicle brake system of the present invention, as shown in the drawings, comprises a pneumatic brake power booster, preferably a vacuum brake power booster 1, which is operable by a brake pedal 3 and is attached to a splashboard 4 (shown schematically only) of the automotive vehicle. On the side of the brake power booster 1 remote from the brake pedal 3, a brake master cylinder, preferably a tandem master cylinder 2, is flanged, its pressure chambers 6, 8 being connected to a pressure fluid supply reservoir 5.

A first hydraulic line 10 connects the first pressure chamber 6, confined by a first master cylinder piston 7, to the wheel brake cylinders of two wheel brakes 18, 19 (shown schematically only) which, possibly, are associated with the rear axle, and the wheel brake cylinders of two further wheel brakes 20, 21 which, possibly, are associated with the front axle, are connected to the second pressure chamber 8, confined by a second master cylinder piston 9, by way of a second hydraulic line 11.

As can further be seen in FIG. 1, valves, preferably hydraulic three-way/two-position directional control valves 12, 13, are inserted into the hydraulic lines 10, 1. Valves 12, 13 are electromagnetically operable, for example, and are activated by a crash sensor 24 when a collision occurs. Change-over of the valves 12, 13 causes parallel connection of pressure fluid receivers 16, 17 to the wheel brakes 18, 19 and 20, 21, thereby simulating an increased fluid requirement which results in an extended actuating travel of the brake pedal 3. Preferably, the introduction of pressure fluid into the pressure fluid receivers 16, 17 can be effected by way of preceding restrictors 14, 15. The volume of the pressure fluid receivers 16, 17 is, preferably, of such a rate that a sufficient braking effect is still achieved in the event of inadvertent actuation of the unit. This measure produces a "smooth" pedal travel characteristic in a frontal impact so that the force impulse acting on the foot of the driver is cushioned by sort of a "shock absorber".

Figure 2:
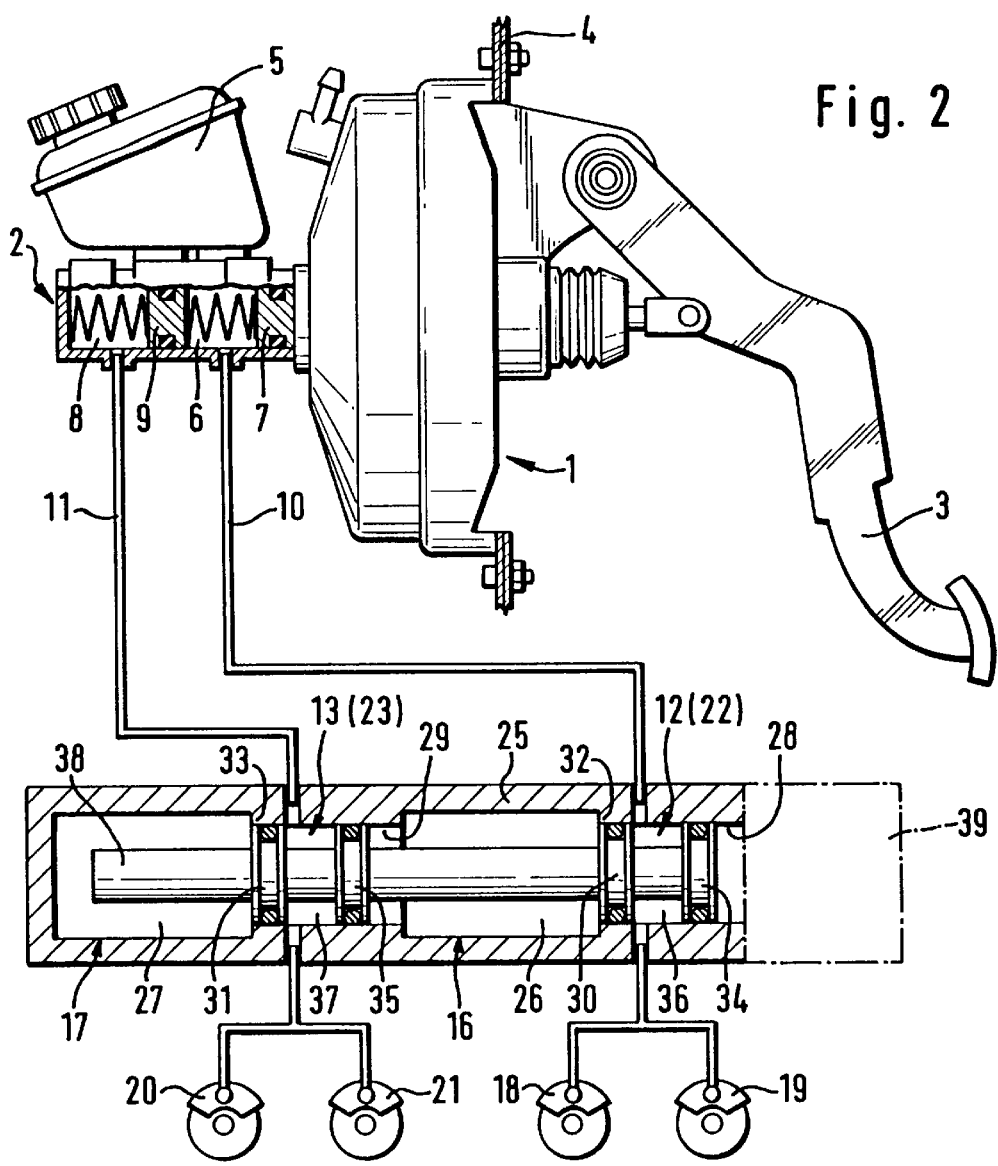
FIG. 2 is a second embodiment of the hydraulic automotive vehicle brake system of the present invention.
Figure 3:
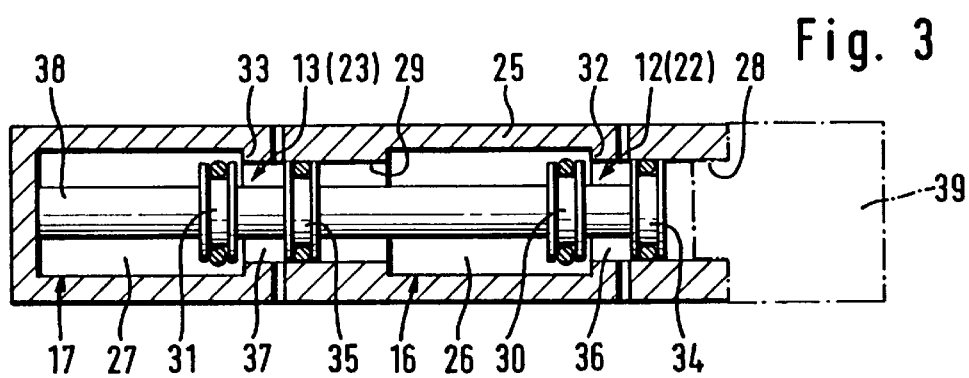
FIG. 3 is a second switch condition of the valve assembly used in the embodiment of FIG. 2.

In the embodiment of the present invention shown in the release position in FIGS. 2 and 3, the previously mentioned valves 12, 13 are provided as slide valves 22, 23 which form a construction unit or assembly group along with the pressure fluid receivers 16, 17. For this purpose, the pressure fluid receivers 16, 17 are provided as accumulator chambers 26, 27 arranged side by side in a housing 25. The slide valves 22, 23 are configured as interconnected slides 30, 31 guided in bores 28, 29 in the housing 25. Slides 30, 31 interact with control edges 32, 33 provided at the ends of the bores 28, 29, the degree of opening of the control edges simultaneously dictating the previously mentioned restricting effect. Along with axially spaced collars 34, 35 which are sealed in bores 28, 29, the slides 30, 31 define annular chambers 36, 37 to which the hydraulic lines 10 and 11 are connected so that the slides 30, 31 are pressure balanced. To limit the opening travel of the slide valves 22, 23, the slide 31, shown on the left hand in the drawing, has an axial extension 38 which abuts on the left-hand end of the housing 25 upon displacement of the slides 30, 31 (FIG. 3). The slide valves 22, 23 can be actuated by means of a release mechanism 39 (shown schematically only) which, for example, operates according to electromechanical, or electromagnetical, or pyrotechnical principles. It is also possible to use the inertia forces which occur in an impact to actuate the valves 22, 23. The housing 25 of the valve assembly should then be mounted in an appropriate position in the automotive vehicle, preferably aligned in the driving direction.

Figure 4:
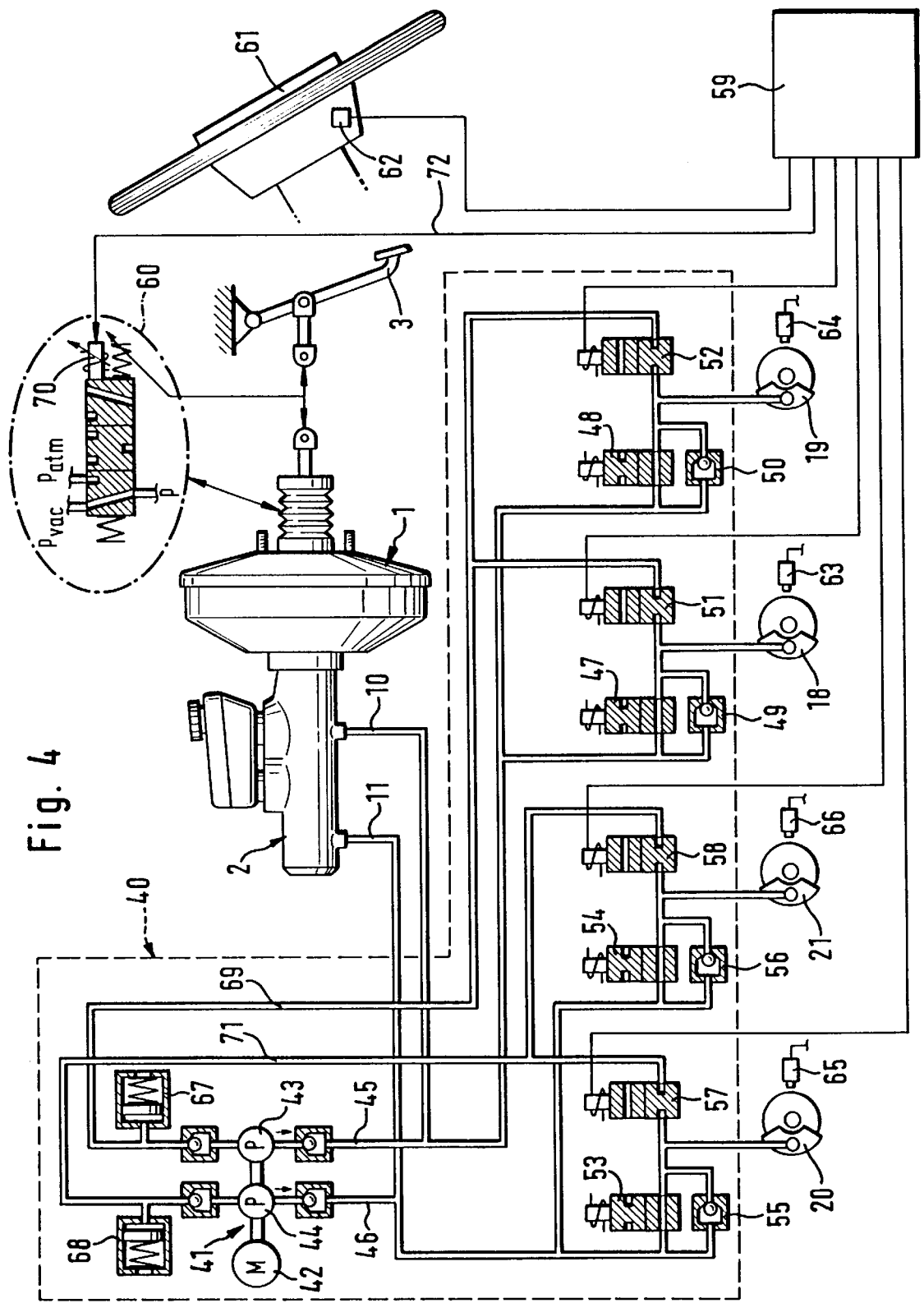
FIG. 4 is a schematic diagram of the brake system of the present invention shown in the basic (i.e. inactive) position.
Figure 5:
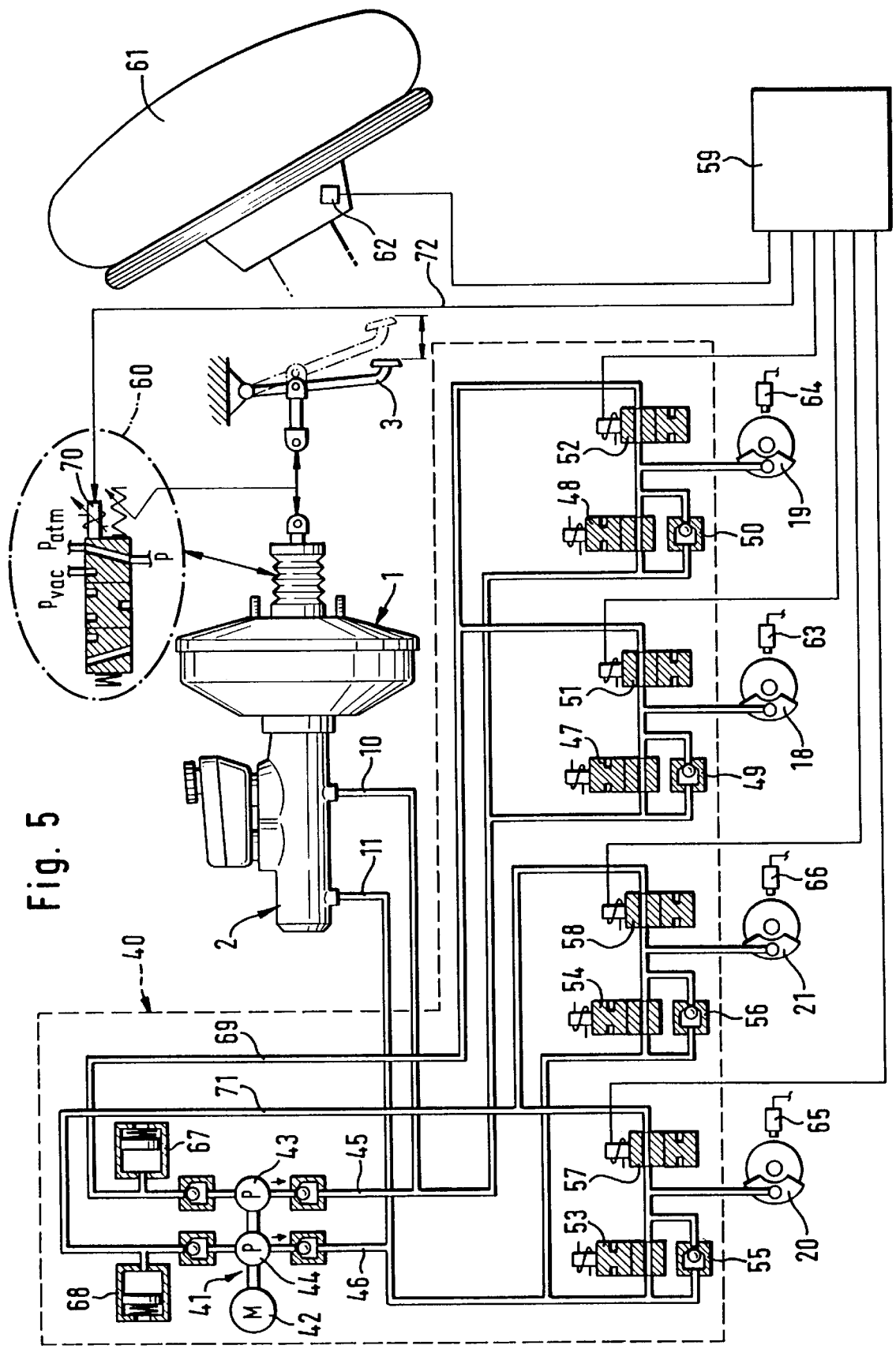
FIG. 5 is a schematic view of the brake system of the present invention depicting the valve piston and brake pedal in the actuating position.

In the embodiment of the brake system of the present invention shown in FIGS. 4 and 5, an ABS pressure modulator 40 is interposed between the master brake cylinder 2 and the individual wheel brakes 18, 19, 20, 21 to permit a modulation of the pressures prevailing in the wheel brakes 18 to 21 during ABS control operations. The ABS pressure modulator 40 has a hydraulic motor-and-pump assembly 41 which comprises a first pump 43 associated with the wheel brakes 18, 19, a second pump 44 associated with the wheel brakes 20, 21 and an electric motor 42 which drives both pumps 43, 44. Hydraulic lines 45, 46 lead from the pressure side of the pumps 43, 44 to the wheel brake pairs 18, 19 and 20, 21, respectively.

Lines 45, 46 are connected with the pressure chambers of the master brake cylinder 2 by way of the lines 10, 11, mentioned with respect to FIG. 1, and include, in parallel connection, associated with the wheel brakes 18 to 21, each one preferably normally open, electromagnetically operable inlet valve 47, 48 and 53, 54, respectively, with each one non-return valve 49, 50 and 55, 56. Further hydraulic lines 69, 71 are connected to the individual wheel brake pairs 18, 19 and 20, 21, respectively, to permit a connection between the wheel brake pairs 18, 19 and 20, 21, respectively, with each one low-pressure accumulator 67 or 68, respectively, by the intermediary of electromagnetically operable, preferably normally closed outlet valves 51, 52 and 57, 58, respectively.

Low-pressure accumulators 67, 68 are connected to the suction side of the associated pump 43 or 44, respectively. The wheel brake pairs 18, 19 or 20, 21, respectively, which, for example, can be associated with a vehicle axle each (black-white brake circuit split-up) are associated with wheel sensors 63, 64, 65, 66, the output signals of which are supplied to an electronic control unit 59 by way of signal lines (not shown). During ABS control operations, control unit 59 produces control or change-over signals both for the inlet valves 47, 48, 53, 54 and the outlet valves 51, 52, 57, 58. In addition, the output signal of an acceleration sensor 62, which can be activated in an accident, is conducted to the electronic control unit 59. The acceleration sensor 62 takes the form of an airbag sensor serving to trigger the airbag 61 in the embodiment shown.

In the basic or inactive position of the brake system of the present invention shown in FIG. 4, hydraulic pressure may develop in the wheel brakes 18 to 21 by way of the normally open (SO) inlet valves 47, 48, 53, 54. In a frontal impact or a crash which is sensed by the acceleration or airbag sensor 62, the electronic control unit 59 produces change-over signals for the normally closed outlet valves 51, 52, 57, 58 which open the connections 69, 71 leading to the low-pressure accumulators 67, 68 so that the pressure fluid volume discharged from the master brake cylinder 2 propagates into the low-pressure accumulators 67, 68. The operating condition of the brake system of the present invention, as described, is shown in FIG. 5.

To further reduce the risk of injury imminent in a crash, a vacuum brake power booster can be used as brake power booster 1. Control valve 60 (shown schematically only) of brake power booster 1 is operable, on the one hand, by way of a valve piston (not shown) coupled to the brake pedal 3 and, on the other hand, irrespective of the actuating force applied to the brake pedal 3, by an electromagnet 70 which is part of the valve piston and is displaceable with it. In an arrangement of this type, the electric control unit 59 produces in the event of a crash, simultaneously with the change-over signals for the outlet valves 51, 52, 57, 58, another control signal which is supplied to the electromagnet 70 by way of a control line 72. The extraneous actuation of the control valve 60 causes the introduction of a pneumatic differential pressure into the housing of the vacuum brake power booster 1. The result is a movement of the valve piston and the brake pedal 3 (FIG. 5) in the actuating direction. This moves the brake pedal 3 actively into a zone which is uncritical with respect to imminent injuries. To ensure a residual braking effect even in a crash, it is appropriate that the low-pressure accumulators 67, 68 are sized smaller than the pressure chambers 6, 8 in the master brake cylinder.

We claim:

1. Hydraulic automotive vehicle brake system comprising:
   a master brake cylinder, a brake power booster connected upstream of the master brake cylinder, and a brake pedal actuating the brake power booster, wherein the actuating assembly is attached to a splashboard of the automotive vehicle,
   means for simulating an increased volume requirement of the brake system in an accident causing deformations of a front part of the automotive vehicle and, thus, permit an increased actuating travel of the actuating assembly.

2. Hydraulic automotive vehicle brake system as claimed in claim 1, further including a pressure fluid receiver connected to at least one of a pressure chambers of the master brake cylinder, and wherein the connection between the pressure fluid receiver and the pressure chamber includes a hydraulic valve which is opened in an accident.

3. Hydraulic automotive vehicle brake system as claimed in claim 2, further including a restrictor is inserted into the connection.

4. Hydraulic automotive vehicle brake system as claimed in claim 3, wherein said automotive vehicle brake system includes one or more wheel brakes and wherein the hydraulic valve is a three-way/two-position directional control valve permitting a permanent connection between the pressure chamber and one or more wheel brakes of said automotive vehicle brake system.

5. Hydraulic automotive vehicle brake system as claimed in claim 4, wherein said hydraulic valve is operable electromagnetically.

6. Hydraulic automotive vehicle brake system as claimed in claim 5, further including a crash sensor coupled to the valve.

7. Hydraulic automotive vehicle brake system as claimed in claim 4, wherein the hydraulic valve is a slide valve.

8. Hydraulic automotive vehicle brake system as claimed in claim 2, wherein the pressure fluid receiver and the hydraulic valve form a construction unit.

9. Hydraulic automotive vehicle brake system as claimed in claim 8, wherein the construction unit is designed integrally with the master brake cylinder.

10. Hydraulic automotive vehicle brake system as claimed in claim 2, wherein the hydraulic valve is operable by inertia forces caused in an accident.

11. Hydraulic automotive vehicle brake system as claimed in claim 1, further including an ABS pressure modulator interposed between the master cylinder and at least two wheel brakes, wherein said ABS pressure modulator includes a motor-and-pump assembly connected to a pressure side of a pressure chamber of said master cylinder, and wherein at least two wheel brakes are connected by way of electromagnetically operable inlet valves, wherein at least two wheel brakes are connected to low-pressure accumulators by way of electro-magnetically operable outlet valves, and wherein the low-pressure accumulators being connected to a suction side of the motor-and-pump assembly, and an electronic control unit is provided which generates actuating or change-over signals for the inlet and outlet valves, wherein the pressure fluid receivers are provided by the low-pressure accumulators and the hydraulic valves are provided by the outlet valves and the electronic control unit for generating the change-over signals for the outlet valves is triggered by the output signal of an acceleration sensor adapted to be activated in an accident.

12. Hydraulic automotive vehicle brake system as claimed in claim 11, wherein the acceleration sensor takes the form of an acceleration-responsive, electromechanic switch.

13. Hydraulic automotive vehicle brake system as claimed in claim 11, wherein the acceleration sensor takes the form of an airbag sensor.

14. Hydraulic automotive vehicle brake system as claimed in claim 11, wherein the brake power booster is configured as a vacuum brake power booster, the control valve of which is operable by a valve piston operatively connected to the brake pedal and, by an electromagnet that is displaceable jointly with the valve piston irrespective of the pedal force acting on the brake pedal, wherein the electromagnet in an accident is adapted to be triggered by a control signal which is generated by the electronic control unit simultaneously with the change-over signals for the outlet valves.

15. Hydraulic automotive vehicle brake system as claimed in claim 11, wherein the pressure fluid receivers have a smaller size in terms of volume than the master cylinder pressure chambers.

* * * * *